(12) United States Patent
Phillips et al.

(10) Patent No.: US 8,231,400 B2
(45) Date of Patent: Jul. 31, 2012

(54) LATCH FOR A CABLE ASSEMBLY

(75) Inventors: Michael J. Phillips, Camp Hill, PA (US); Randall Robert Henry, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/791,682

(22) Filed: Jun. 1, 2010

(65) Prior Publication Data
US 2011/0294334 A1 Dec. 1, 2011

(51) Int. Cl.
*H01R 13/627* (2006.01)
(52) U.S. Cl. ...................................... 439/357
(58) Field of Classification Search ............ 439/357, 439/352, 372
See application file for complete search history.

(56) References Cited

U.S. PATENT DOCUMENTS

| | | | |
|---|---|---|---|
| 6,149,451 A | 11/2000 | Weber et al. | |
| 7,281,937 B2 * | 10/2007 | Reed et al. | 439/352 |
| 7,318,740 B1 * | 1/2008 | Henry et al. | 439/352 |
| 7,445,484 B2 * | 11/2008 | Wu | 439/352 |
| 7,473,124 B1 * | 1/2009 | Briant et al. | 439/352 |
| 7,481,664 B1 | 1/2009 | Knoll et al. | |
| 7,534,125 B1 * | 5/2009 | Schroll | 439/352 |
| 7,559,785 B1 * | 7/2009 | Wu | 439/352 |
| 7,572,138 B1 * | 8/2009 | Wu | 439/352 |
| 2007/0059953 A1 | 3/2007 | Togami et al. | |

FOREIGN PATENT DOCUMENTS

| | | |
|---|---|---|
| DE | 10 2006 021836 A1 | 11/2007 |
| WO | WO 2006/125460 A1 | 11/2006 |

OTHER PUBLICATIONS

European Search Report, European Application No. 11168260.5, International Filing Date Sep. 23, 2011.

* cited by examiner

*Primary Examiner* — Renee Luebke
*Assistant Examiner* — Harshad Patel

(57) ABSTRACT

A latch assembly for a connector is provided. The latch assembly includes a latch coupled to the connector. The latch includes a crossbar and a latch arm extending from the crossbar. The latch arm is configured to engage a mating connector. An anchor point engages the latch. The latch rotates about the anchor point between an open position, where the latch arm is configured to disengage from the mating connector, and a closed position. where the latch arm is configured to engage the mating connector. A biasing mechanism engages the crossbar of the latch to bias the latch into the closed position, wherein in the closed position the latch assembly generates a latch force on the mating connector in a direction opposite to a load force imposed on at least one of the connector and the mating connector.

21 Claims, 5 Drawing Sheets

LATCH FOR A CABLE ASSEMBLY

BACKGROUND OF THE INVENTION

The subject matter herein relates generally to cable assemblies, and more particularly, to a latch for cable assemblies.

Cable assembly connectors generally include a latch for securely coupling the connector to a mating connector. The latch is secured to a housing of the connector and configured to oppose load forces that may be imposed on the connector by the mating connector. The load forces are typically applied axially along the cable assembly and may cause the connector and mating connector to disengage. Generally, the latch includes a latching element and a retention spring that are formed as a single piece. The latching element engages a latch cavity of the mating connector to secure the connector thereto. The retention spring provides a latch force that biases the latching element about an axis and into engagement with the latch cavity.

Known connectors with latches. however, are not without disadvantages. For instance, known connector latches are easily plastically deformed through repeated use of the latch and repeated depression of the latch downwards towards the connector. For example, the latches may not return to the original position or shape of the latch after the load is removed from the latch. As the latches become plastically deformed, the latches do not secure the connectors together as well as the latches did prior to being plastically deformed. Other known connectors have relatively complex latches that may be expensive and time-consuming to manufacture.

Additionally, a latch force generated by the retention spring may be generated in a direction that is perpendicular to a load force that may be imposed on the connector. A load force is generally generated along a longitudinal axis of the cable assembly connector, whereas the latch force may be generated perpendicular to the longitudinal axis of the cable assembly connector. The perpendicular arrangement of the latch force and the load force may cause the retention spring to bow. Bowing of the retention spring reduces the amount of load force necessary to de-latch the connector and the mating connector and may allow disengagement of the connector and the mating connector.

Thus a need remains for a latching assembly that provides a latch force in a direction opposite the load forces on the connector.

SUMMARY OF THE INVENTION

In one embodiment, a latch assembly for a connector is provided. The latch assembly includes a latch coupled to the connector. The latch includes a crossbar and a latch arm extending from the crossbar. The latch arm is configured to engage a mating connector. An anchor point engages the latch. The latch rotates about the anchor point between an open position, where the latch arm is configured to disengage from the mating connector, and a closed position, where the latch arm is configured to engage the mating connector. A biasing mechanism engages the crossbar of the latch to bias the latch into the closed position, wherein in the closed position the latch assembly generates a latch force on the mating connector in a direction opposite to a load force imposed on at least one of the connector and the mating connector.

In another embodiment, a latch assembly for a connector is provided. The latch assembly includes a latch coupled to the connector. The latch includes a crossbar and a latch arm extending from the crossbar. A latch point is positioned on an end of the latch arm opposite the crossbar. The latch point is configured to engage a mating connector. An anchor point engages the latch. The latch rotates about the anchor point between an open position, where the latch point is configured to disengage from the mating connector, and a closed position, where the latch point is configured to engage the mating connector. The latch point and the anchor point are positioned in a plane that extends parallel to a longitudinal axis of the connector, when the latch assembly is in the closed position.

In another embodiment, a cable connector is provided. The cable connector includes a housing having a cable end and a mating end. The mating end is configured to engage a mating connector. A latch assembly is coupled to the housing. The latch assembly is configured to secure the connector to the mating connector. The latch assembly includes a latch having a crossbar and a latch arm extending from the crossbar. A latch point is positioned on an end of the latch arm opposite the crossbar. An anchor point engages the latch. The latch rotates about the anchor point between an open position and a closed position. The latch point is configured to engage the mating connector. when the latch is in the closed position. The latch point and the anchor point are positioned in a plane that extends parallel a longitudinal axis of the connector, when the latch assembly is in the closed position.

DETAILED DESCRIPTION OF THE DRAWING

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
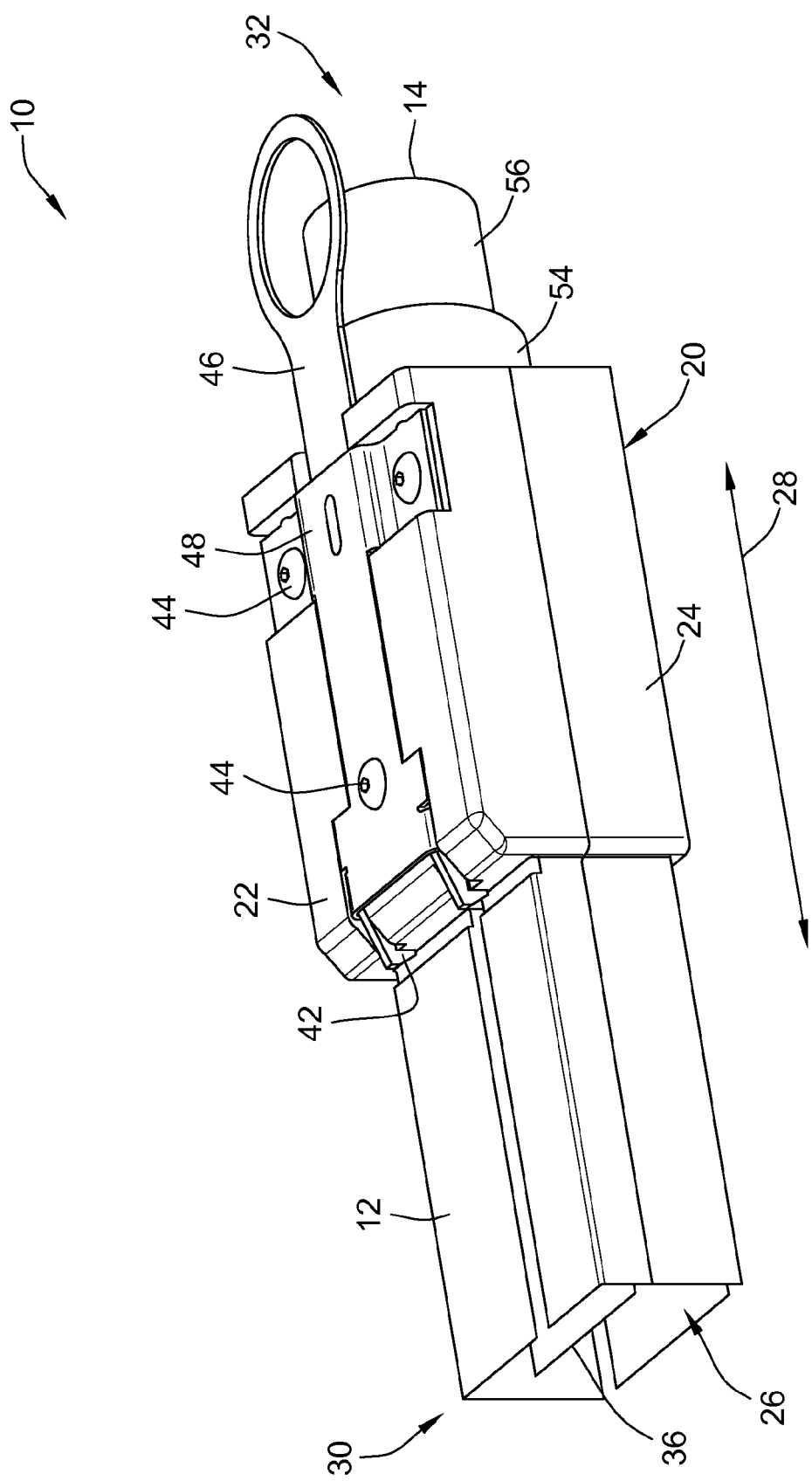
FIG. 1 is a front perspective view of a cable assembly formed in accordance with an embodiment.

FIG. 1 is a view of a cable assembly 10 formed in accordance with an exemplary embodiment. The cable assembly 10 includes a connector 12 mounted to an end of a cable 14. The cable 14 may be any conductor material, for example, a fiber optic based or copper based cable. In the illustrated embodiment, the connector 12 represents a transceiver. The connector 12 may be a fiber optic based or a copper based transceiver. The connector 12 is configured to be pluggably connected to an electronic device, such as into a circuit board mounted receptacle connector or into a cable mounted receptacle connector. Optionally, the connector 12 may be constructed according to a particular standard. such as the Small Form-factor Pluggable (SFP) module standard. defining size and compatibility requirements. In alternative embodiments, the subject matter herein may be used in other types of cable mounted connectors other than transceivers.

The cable assembly 10 includes a housing 20 having an upper shell 22 and a lower shell 24 coupled together to define a cavity 26 therebetween. The cavity 26 extends along a longitudinal axis 28 between a mating end 30 and a cable end 32. The cable assembly 10 includes one or more circuit board (s) 36 received in the cavity 26 proximate to the mating end 30. The circuit boards 36 define a mating interface for mating with a mating connector 150 (shown in FIG. 6). The circuit boards 36 are terminated to one or more conductor(s) of the cable 14. For example, the cable 14 may include a center conductor terminated to one or more of the circuit boards 36. In an alternative embodiment, rather than circuit boards 36, the cable assembly 10 may include individual contacts arranged proximate to the mating end 30 for mating with a corresponding mating connector. The individual contacts may be terminated to ends of individual conductors, for example, wires of the cable 14.

The cable 14 is secured to the connector 12 using a retainer 54. The retainer 54 couples to the connector 12 and also engages an outer jacket 56 of the cable 14 to secure the jacket 56 relative to the housing 20. In an exemplary embodiment, the retainer 54 is manufactured from a dielectric material, such as a plastic or a rubber material. The retainer 54 is secured to the jacket 56 during an overmolding process. In an alternative embodiment, the retainer 54 is secured to the jacket 56 by a bonding operation. The retainer 54 may be secured to the jacket 56 by other processes in other alternative embodiments. Optionally, rather than being manufactured from a dielectric material, the retainer 54 may be manufactured from a metal material. The retainer 54 may be secured to the jacket 56 by a crimping operation.

The cable assembly 10 includes a latch 42 for securely coupling the connector 12 to the mating connector 150. An actuator 46 for operating the latch 42 extends from near the cable end 32. The latch 42 and the actuator 46 may be secured to the housing 20 using an actuator guide 48. The actuator guide 48 is positioned over the latch 42 and the actuator 46. The actuator guide 48 may be secured to the housing 20 using fasteners 44. The fasteners 44 may also be used to securely couple the upper shell 22 to the lower shell 24. The latch 42 is biased into a closed position. In the closed position, the latch 42 opposes load forces that may be imposed on either the cable assembly 10 and/or the mating connector 150. The latch 42 imposes a latching force on the mating connector 150 to overcome the load forces and prevent the mating connector 150 from moving relative to the cable assembly 10. The load forces may be generated substantially parallel to the longitudinal axis 28 in the mating end 30, in which case the latching force generated by the latch 42 is substantially parallel to the longitudinal axis 28 in a direction of the cable end 32.

To release the latch 42, a release force is directly or indirectly applied to the actuator 46 in the direction of the cable end 32. The actuator 46 engages the latch 42 to overcome the force of a biasing mechanism 90 so that the latch 42 is moved into, an open position, wherein the cable assembly 10 is disconnected from the mating connector 150. When the release force is removed from the actuator 46, the actuator moves back into a closed position.

Figure 2:
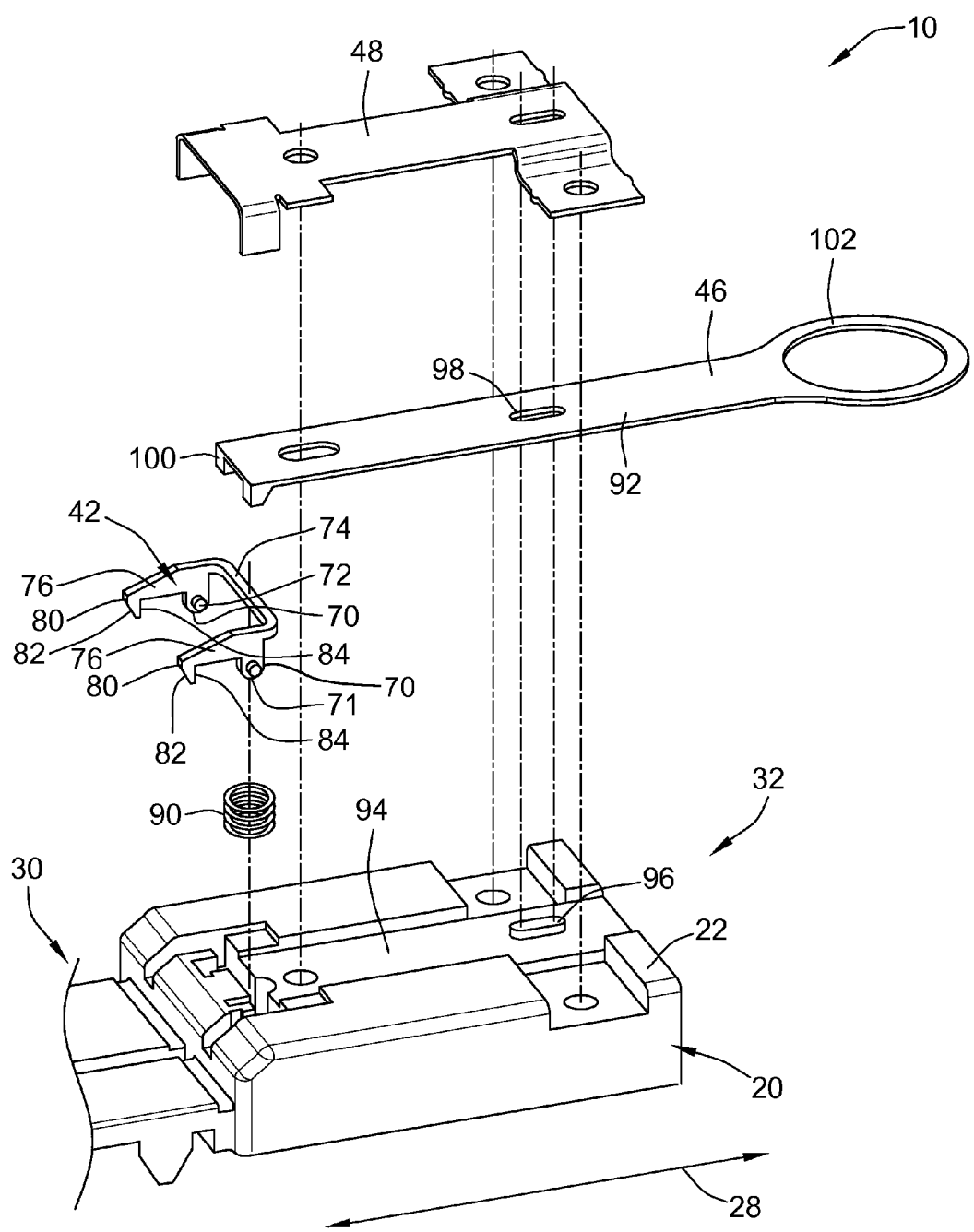
FIG. 2 is an exploded view of the cable assembly, shown in FIG. 1.

FIG. 2 is an exploded view of the cable assembly 10 shown in FIG. 1. The latch 42 is coupled to the housing 20 and is configured to engage the mating connector 150 (shown in FIG. 6) to secure the cable assembly 10 and the mating connector 150 together. For example, the latch 42 may prevent the cable assembly 10 from being moved relative to the mating connector 150 along a direction of a load force 156 (shown in FIG. 6) that may be imposed on the mating connector 150 and/or the cable assembly 10:

The latch 42 includes pivotable bases 70 and one or more anchor points. In an exemplary embodiment, the anchor points may be axels 72. Alternatively, the anchor points may be any suitable mechanism for anchoring the latch. In an illustrated embodiment, an axel 72 extends from each base 70. The axel 72 may extend through each base 70. Optionally, the axel 72 may extend from a side of the base 70 or be positioned within a cavity formed in the base 70. The bases 70 have rounded ends 71 to allow rotation of the bases 70 relative to the upper shell 22. The upper shell 22 may include rounded cavities to receive the rounded ends 71. The rounded ends 71 rotate within the rounded cavities. In the exemplary embodiment, the bases 70 rotate about the axels 72. Alternatively, the latch 42 may not include axels 72, but rather the bases 70 are otherwise retained in the rounded cavity such that the rounded ends rotate within the rounded cavity. In another embodiment, the bases 70 may not include rounded ends 71 and rotate only with respect to the axels 72 without contacting the upper shell 22. The axle 72 is separate and discrete from the base 70 and is coupled to the base 70. Alternatively, the axel 72 may be formed integrally with the base 70. In the exemplary embodiment, the latch 42 includes two bases 70 and two axels 72. However, the latch 42 may include any number of bases 70 and axels 72. For example, the latch 42 may include a single base 70 centered with respect to the upper shell 22. or the latch 42 may include more than two bases 70 to support the latch 42. In an embodiment having a plurality of bases 70, only some of the bases 70 may include axels 72.

A crossbar 74 extends between and couples the bases 70. The crossbar 74 may also be configured to extend past the bases 70. In an embodiment having a single base 70, the crossbar 74 may be configured as a tab extending from the base 70. The crossbar 74 is provided rearward of the axels 72 toward the cable end 32 with respect to the axels 72. The distance between the axels 72 and the crossbar 74 defines a moment arm that controls the operation of the latch 42 when a force is transferred to the crossbar 74 via the actuator 46. The greater the moment arm required to overcome a load capacity of a biasing mechanism 90, the further rearward the crossbar 74 may be positioned from the axels 72. The crossbar 74 may also include a cavity to receive the biasing mechanism 90. Optionally, the crossbar 74 may include a slot, tab, notch, or any other suitable coupling mechanism to couple to the biasing mechanism 90.

Arms 76 extend from the bases 70 toward the mating end 30 of the cable assembly 10. Each arm 76 is positioned on a side of the base 70 that is opposite to the crossbar 74. The lengths of the arms 76 may be selected based, at least in part. on a moment arm necessary to create a latch force on the mating connector. Additionally, the lengths of the arms 76 depends on the position of a latch cavity 154 (shown in FIG. 6) provided on the mating connector 150. Optionally, there may be a single arm or more than two arms, .and some of the arms 76 may have different lengths than other arms 76. Alternatively, the arms 76 may extend from the crossbar 74 rather than the bases 70. In another embodiment, the latch 42 may include a second crossbar positioned toward the mating end 30 of the bases 70. One or more arms 76 may extend from the second crossbar.

Each arm 76 includes a hook 80 at a distal end thereof for engaging a latch cavity 154 of the mating connector 150. In an exemplary embodiment, the hooks 80 and axels 72 are in a plane that is parallel to the longitudinal axis 28 when the latch is in the closed position. When the latch 42 is rotated into the open position, the hook 80 and axels 72 are positioned in a plane that extends at an angle with respect to the longitudinal axis 28. In the closed position, the hook 80 and the axles 72 are capable of providing a latch force that extends along the longitudinal axis 28.

Each hook 80 includes a rounded front end 82 that is configured to engage the mating connector 150 when the mating connector 150 is coupled to the connector 10. During coupling, the rounded front end 82 operates as a ramp to bias the latch 42 into an open position. Each hook 80 also includes a latch point configured to engage the mating connector 150. In the illustrated embodiment, the latch point is a flat catch surface 84 at an end of the hook 80 toward the cable end 32. Alternatively, the latch 42 may include any suitable latch point for engaging the mating connector 150. The catch surface 84 is received within the latch cavity 154 when the cable assembly 10 is coupled to the mating connector 150. The flat catch surface 84 may also include a tab extending toward the cable end 32 that is configured to catch a lip or notch formed in the latch cavity 154. Optionally, the hooks 80 may be sized to create an interference fit with the latch cavity 154, wherein the hooks 80 are retained within the latch cavity 154 via friction. In another embodiment, the hooks 80 may include teeth that engage the side of the latch cavity 154 or notches formed in the latch cavity 154.

The latch 42 is positioned within the upper shell 22 of the cable assembly 10 via the axels 72. Alternatively, the bases 70 may retain the position of the latch 42 within the upper shell 22. The latch 42 is configured to rotate about the axels 72 between the open position and the closed position. The latch 42 may also rotate about the rounded ends 71 of the base 70. In one embodiment, the latch 42 rotates within a range between 0 degrees and 90 degrees with respect to the longitudinal axis 28, wherein the latch 42 is in the closed position and parallel to the longitudinal axis 28 at 0 degrees. Additionally, the latch 42 may close at an angle that is not parallel to the longitudinal axis 28. For example, the closed position of the latch 42 may be −10 degrees with respect to the longitudinal axis 28.

In the open position, the hooks 82 of the latch 42 are positioned away from the connector 20 and, if coupled, the mating connector 150. In the closed position, the hooks 82 of the latch 42 are positioned near to or in contact with the connector 20 and, if coupled, the mating connector 150. The biasing mechanism 90 biases the latch 42 in the closed position and is positioned in contact with the crossbar 74 to bias the latch 42 into the closed position. The biasing mechanism 90 may be positioned flush with the crossbar 74 and/or be coupled thereto using any suitable coupling mechanism. In the exemplary embodiment, the biasing mechanism 90 is a spring. Alternatively, the biasing mechanism 90 may be any mechanism capable of biasing the latch 42 in the closed position. The biasing mechanism 90 is selected and sized based on a required load capacity to offset the load force 156 such that such load force 156 does not cause the latch 42 to disengage from the latch cavities 154. The latch 42 may also include any number of biasing mechanisms to offset the load force 156.

The actuator 46 includes ramps 100 configured to engage the crossbar 74 of the latch 42. The ramps 100 are configured to bias the crossbar 74 against the biasing mechanism 90. The actuator 46 includes a loop 102 for a user to apply force to the actuator 46. Alternatively, the actuator 46 may include a tab, a knob, or any other suitable force application mechanism. A user applies force to the actuator 46 by pulling the loop 102 along the longitudinal axis 28 in the direction of the cable end 32. As the force is applied, the ramps 100 engage the crossbar 74 of the latch 42 to counteract the force of biasing mechanism 90. The latch 42 is rotated into the open position to disengage the hooks 80 of the latch 42 from the latch cavity 154 of the mating connector 150.

The actuator guide 48 retains the actuator 46 within a groove 94 of the upper shell 22. The actuator guide 48 also retains the latch 42 and the biasing mechanism 90 within the upper shell 22. The actuator guide 48 is secured to the upper shell 22 with fasteners 44. The actuator 46 includes an elongated portion 92 that extends along the groove 94. The groove 94 includes a positioning tab 96 and the actuator 46 includes a positioning slot 98. The positioning slot 98 engages the positioning tab 96 to guide the actuator 46 as the actuator 46 slides through groove 94. The actuator 46 is configured to slide along the longitudinal axis 28 within actuator guide 48 and the groove 94.

Figure 3:
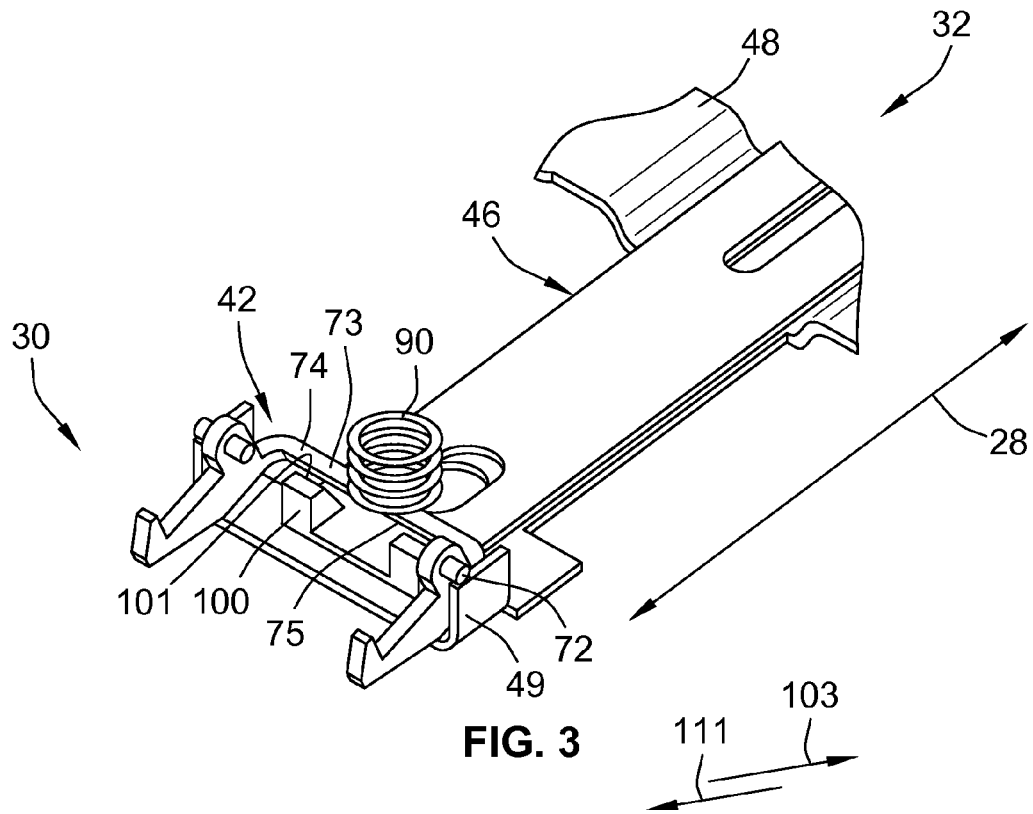
FIG. 3 illustrates a bottom view of the latch, shown in FIG. 2

FIG. 3 illustrates a bottom view of the latch 42. The crossbar 74 includes a bottom surface 73 and a mating end surface 75. The bottom surface 73 engages the biasing mechanism 90. In one embodiment, the bottom surface 73 is positioned flush against the biasing mechanism 90. Alternatively, the biasing mechanism 90 may rest within a recess formed on the bottom surface 73. In another embodiment, the bottom surface 73 may include a notch, a tab, or any other suitable coupling mechanism to couple the biasing mechanism 90 to the crossbar 74. The biasing mechanism 90 engages the crossbar 74 to bias the latch 42 into the closed position.

The ramps 100 of the actuator 46 include a ramp surface 101. The ramp surface 101 is sloped from the elongated portion 92 of the actuator 46 toward the mating end 30 of the connector assembly 10. The ramp surface 101 is configured to engage the mating end surface 75 of the crossbar 74. The ramp surface 101 may be positioned flush against the mating end surface 75. Optionally, the ramp surface 101 is drawn into contact with the mating end surface 75 when force in the direction of the cable end 32 is applied to the actuator 46 along the longitudinal axis 28. In another embodiment, the mating end surface 75 may include slots and the ramp surface 101 may include tabs that engage the slot of the mating end surface 75. Alternatively, the slots may be disposed on the ramp surface 101 and the tabs disposed on the mating end surface 75.

The ramp surface 101 engages the mating end surface 75 as force is applied to the actuator 46. The force causes the ramp surface 101 to slide along the mating end surface 75, thereby biasing the latch 42 against the biasing mechanism 90. If the force on the actuator 46 exceeds the load capacity of the biasing mechanism 90, the biasing mechanism 90 is actuated to allow the latch 42 to rotate into the open position. Upon releasing the force on the actuator 46, the biasing mechanism 90 causes the mating end surface 75 to engage the ramp surface 101. The ramp surface 101 is biased back into a position that enables the latch 42 to rotate into the closed position.

As illustrated in FIG. 3, the actuator guide 48 is positioned flush on the actuator 46. The actuator guide 48 and the actuator 46 may also include suitable coupling mechanisms to couple the actuator guide 48 to the actuator 46. The actuator guide 48 also includes a tab 49. The tab 49 is positioned against the axels 72 of the latch 42. The tab 49 may include a recess or other coupling mechanism to couple to the axels 72. The actuator guide 48 is secured to the upper shell 22 and retains the latch 42, axels 72, biasing mechanism 90, and actuator 46 in position within cavities or pockets formed in the upper shell 22. The cavities of the upper shell 22 are described in more detail with respect to FIG. 5.

Figure 4:
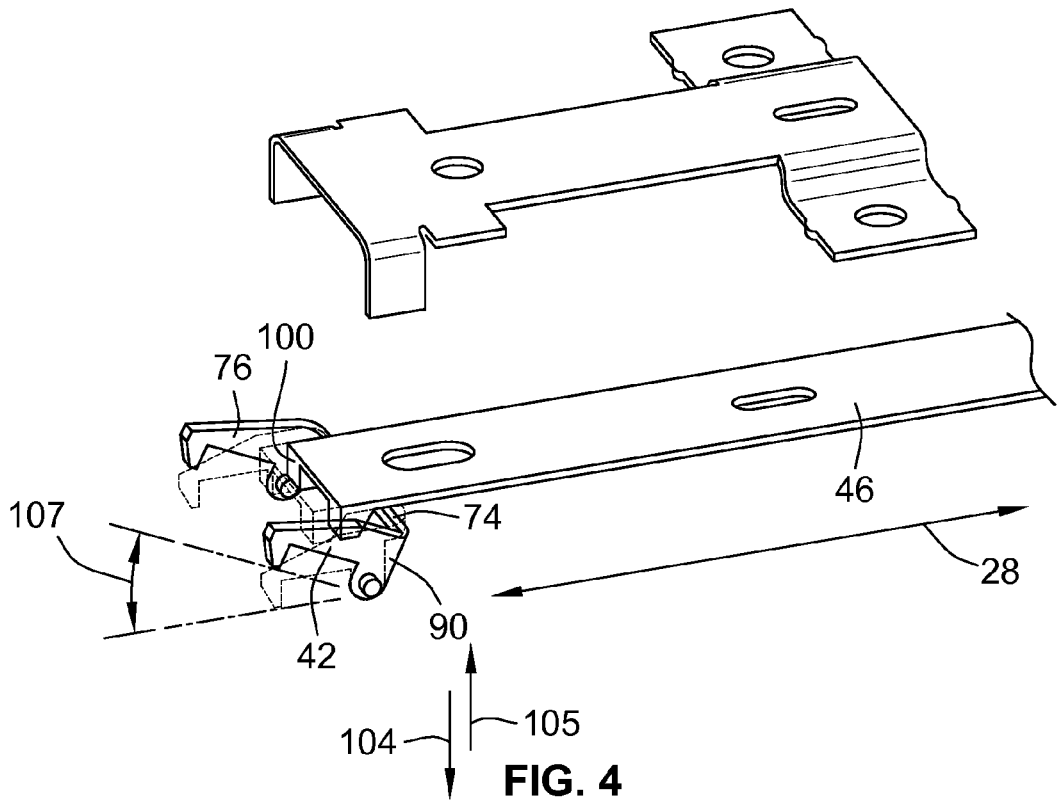
FIG. 4 illustrates the actuator, shown in FIG. 2, engaging the latch, shown in FIG. 2.

FIG. 4 illustrates the engagement of the actuator 46 and the latch 42. The engagement of the actuator 46 and the latch 42 rotates the latch 42 into the open position as is illustrated in FIG. 4. The actuator begins in a closed position. A release force 103 is directly or indirectly applied to the actuator 46 to move the actuator 46 into an open position, as is illustrated in FIG. 4. The release force 103 is applied substantially parallel to the longitudinal axis 28. The ramps 100 of the actuator 46 engage the crossbar 74 and create an opening force 105 that overcomes the load capacity of the biasing mechanism 90. The opening force 105 is substantially perpendicular to the longitudinal axis 28. The opening force 105 on the biasing mechanism 90 enables the latch 42 to rotate into the open position. In the open position, the latch 42 is oriented at an angle 107 with respect to the longitudinal axis 28. In one embodiment, the angle 107 may be within a range of 0 degrees to 90 degrees.

When the force on the actuator 46 is removed, the biasing mechanism 90 creates a closing force 109. The closing force 109 is opposite the opening force 105. The biasing mechanism 90 pushes the crossbar 74 into contact with the ramps 100 of the actuator 46. A repositioning force 111 is generated in a direction that is opposite the release force 103 and moves the actuator 46 back to the closed position. As the actuator 46 moves into the closed position, the latch 42 is biased into the closed position by the biasing mechanism 90. In the closed position, the arms 76 of the latch 42 are positioned substantially parallel to the longitudinal axis 28. Alternatively, in the closed position, the arms 76 may be positioned at a negative angle relative to the longitudinal axis 28.

Figure 5:
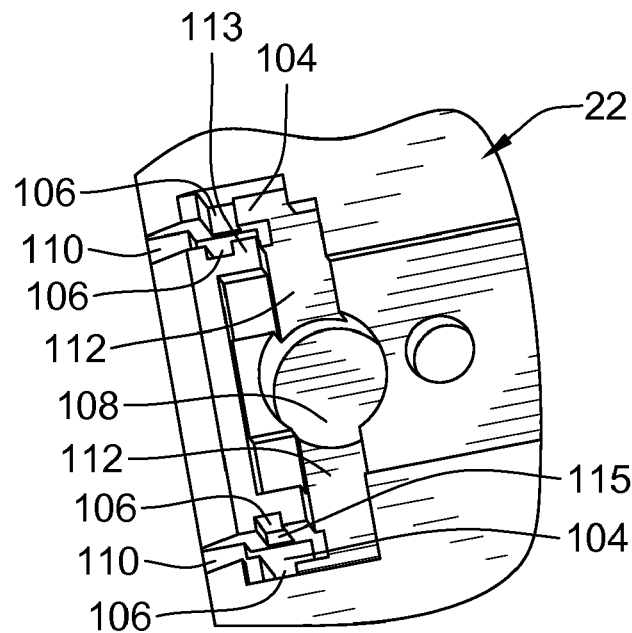
FIG. 5 is a top perspective view of the upper shell, shown in FIG. 1

FIG. 5 is a top perspective view of the upper shell 22 shown in FIG. 1. The upper shell 22 includes retention cavities for retaining the latch 42. A base cavity 104 is sized and shaped to retain the bases 70 of the latch 42. A surface 113 of the base cavity 104 may be rounded to receive the rounded ends 71 of the base 70. Optionally, the surface 113 may have any configuration that enables the base 70 to rotate therein. Additionally, the surface 113 of the base cavity 104 may have a reduced friction and/or be lubricated to allow rotation of the base 70. In another embodiment, the base 70 may include tabs or ridges that correspond to slots formed in the base cavity 104. The tabs lock into the slots to retain the base 70 within the base cavity 104. The tabs move within the slots to enable rotation of the base 70.

An axel cavity 106 is configured to retain the axels 72 of the latch 42. The axel cavity 106 is sized and shaped to allow rotation of the axel 72 therein. A surface 115 of the axel cavity 106 may be rounded and/or have any configuration that enables rotation of the axel 72. Additionally, the surface 115 may have a reduced coefficient of friction and/or be lubricated to enable rotation of the axel 72. In one embodiment, the axel pocket may include apertures to receive a portion of the axel 72 therein. The apertures retain the axel 72 within the upper shell 22.

A biasing mechanism cavity 108 is provided to retain the biasing mechanism 90. The size and shape of the biasing mechanism cavity 108 is dependant on a load capacity of the biasing mechanism 90. As the required load capacity of the biasing mechanism 90 is increased a size of the biasing mechanism 90 may also increase. Accordingly, the size and shape of the biasing mechanism cavity 108 may increase with an increase in the size of the biasing mechanism 90. The biasing mechanism cavity 108 may include a slot, tab, notch, and/or other suitable coupling feature to couple the biasing mechanism 90 within the biasing mechanism cavity 108.

Arm cavities 110 are provided for the arms 76 to rest therein when the latch 42 is in the closed position. The arm cavities 110 are sized and shaped to receive the arms 76 when the latch 42 is in the closed positioned. Additionally, a crossbar cavity 112 is provided to retain the crossbar 74. The crossbar cavity 112 has a depth that enables the crossbar 74 to move as the latch 42 is rotated.

In the exemplary embodiment the latch 42 and the biasing mechanism 90 are retained within the cavities 104, 106, 108, 110, and 112 by the actuator guide 48. The actuator guide 48 is positioned above the latch 42 and biasing mechanism 90. The actuator guide is then coupled to the upper shell 22 using fasteners 44 to retain the latch 42 and biasing mechanism 90 thereunder.

Figure 6:
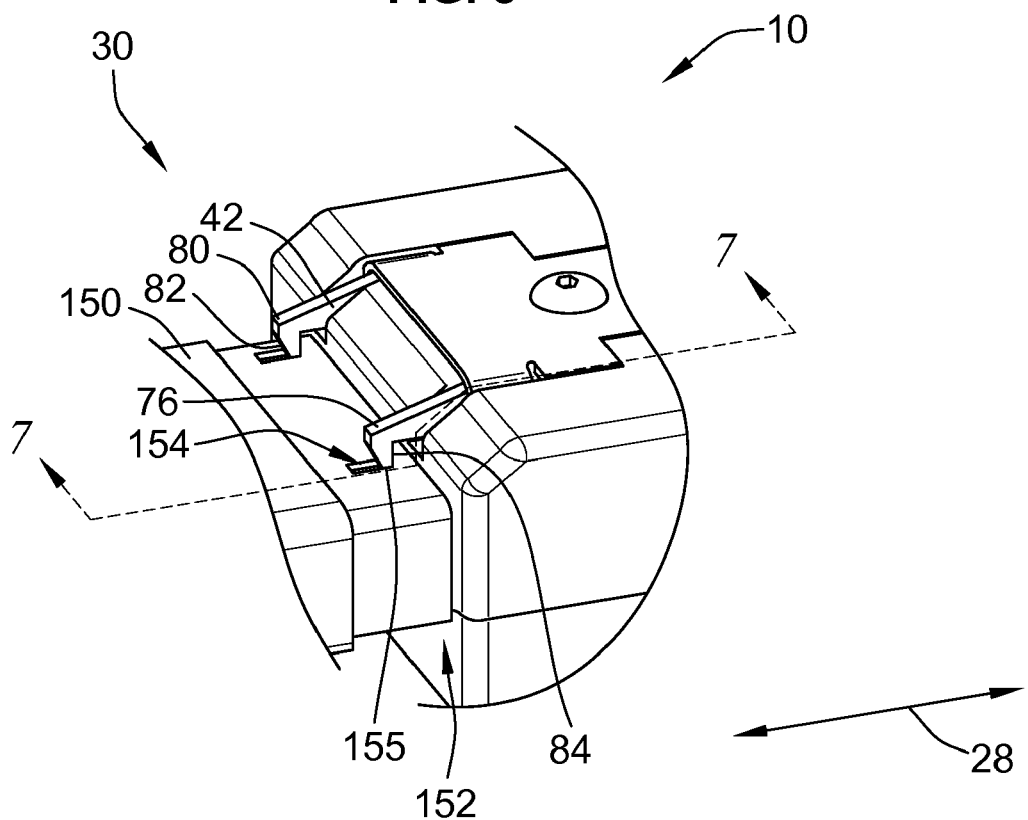
FIG. 6 is a view of the cable assembly, shown in FIG. 1, coupled to a mating connector.

FIG. 6 is a view of the cable assembly 10 coupled to the mating connector 150. Only an outer shell portion of the mating connector 150 is illustrated in FIG. 6. The mating end 30 of the cable assembly 10 is configured to be received within a mating end 152 of the mating connector 150. The mating connector 150 includes latch cavities 154 having mating ends 155. The latch cavities 154 are aligned with the arms 76 of the latch 42.

The arms 76 of the latch 42 extend from the upper shell 22 and are positioned over the mating end 152 of the mating connector 150. The latch 42 is illustrated in the closed position. In the closed position, the arms 76 of the latch 42 are positioned substantially parallel to the longitudinal axis 28 of the cable assembly 10.

When the cable assembly 10 is coupled to the mating connector 150. the rounded front end 82 of each hook 80 contacts the mating end 152 of the mating connector 150. The rounded front end 82 slides along the mating end 152 causing the latch 42 to bias against the biasing mechanism 90. The latch 42 is rotated into an open position automatically without pulling the actuator 46. In an open position, the latch 42 can engage the latch cavity 154 of the mating connector 150. Once the cable assembly 10 is mated to the mating connector 150, the biasing mechanism 90 biases the latch 42 back into the closed position wherein the hooks 80 are positioned within the latch cavity 154.

The catch surface 84 of the hook 80 is flat to engage the latch cavity 154 and retain the latch 42 therein. The catch surface 84 engages the mating end 155 of the latch cavity 154 to retain the cable assembly 10 within the mating connector 150. In one embodiment, the flat catch surface 84 of the hook 80 may also include a tab configured to catch a lip of the latch cavity 154.

Figure 7:
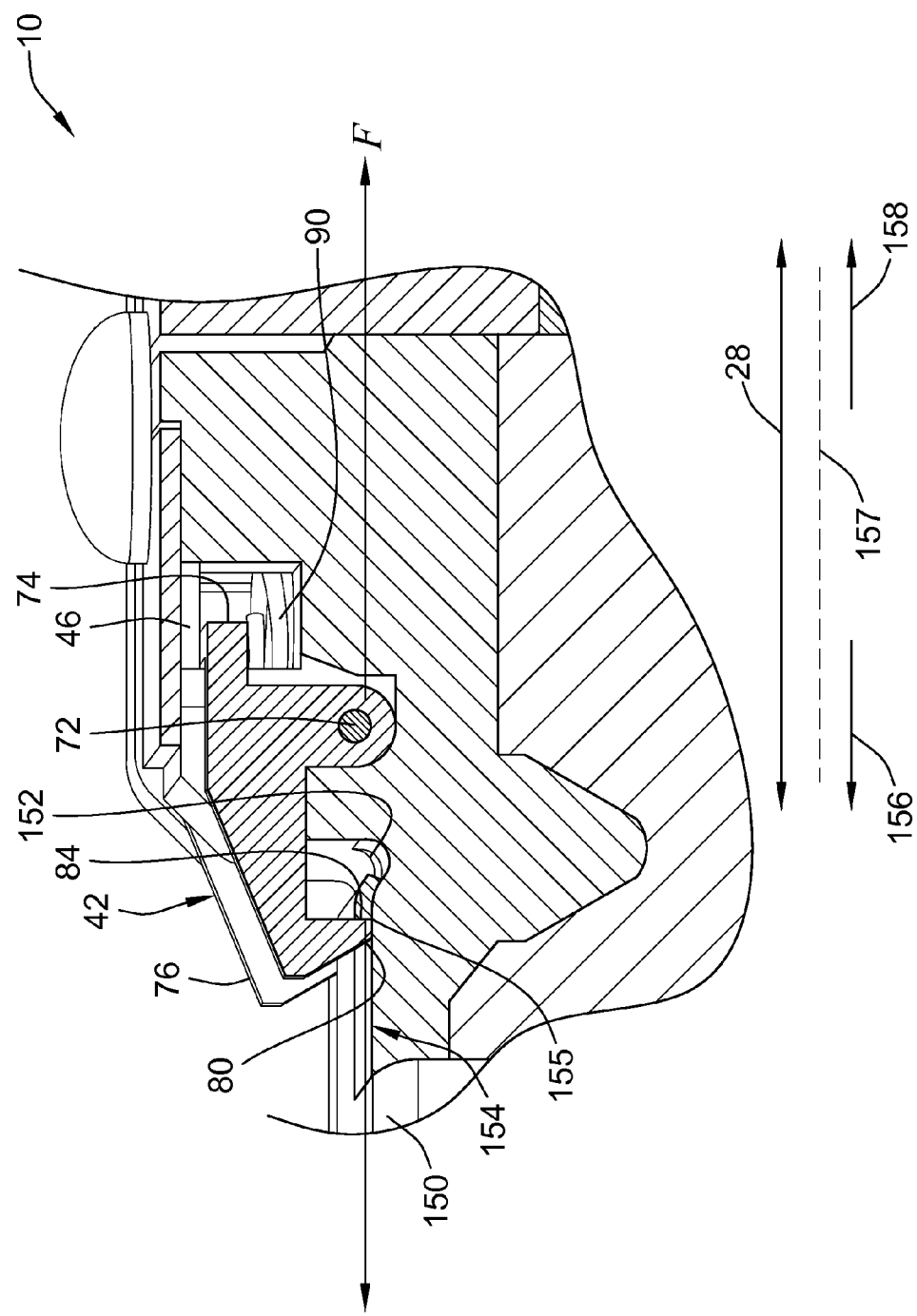
FIG. 7 illustrates a side cross-sectional view of the cable assembly taken along line 6 of FIG. 6.

FIG. 7 illustrates a side cross-sectional view of the cable assembly 10 taken along line 7-7 of FIG. 6. FIG. 7 illustrates the latch 42 in the closed position. The biasing mechanism 90 engages the crossbar 74 and biases the crossbar 74 upward. The latch 42 is rotated about the axels 72 so that the crossbar 74 and the arms 76 are in substantially the same longitudinal plane, wherein the longitudinal plane is parallel to the longitudinal axis 28. In the longitudinal plane. the arms 76 are biased into engagement with the mating connector 150. The hooks 80 are positioned within the latch cavities 154. The catch surface 84 of the hook 80 engages the mating end 155 of the latch cavity 154 to retain the cable assembly 10 within the mating connector 150.

A load force 156 extends along and substantially parallel to the longitudinal axis 28 in a direction that may cause the cable assembly 10 to move with respect to the mating connector 150. The load force 156 represents a longitudinal force that may disengage the cable assembly 10 from the mating connector 150. The biasing mechanism 90 has a load capacity that is at least equivalent to the load force 156. The load capacity of the biasing mechanism 90 is transferred to the latch 42 to enable the latch 42 to generate a latch force 158. In response to the load force 156, the latch force 158 opposes the load force 156. The latch force 158 is imposed by the ends 84 of the hooks 80 on the mating end 155 of the latch cavity 154. The latch force 158 is imposed in a direction that is opposite the load force 156. Both the load force 156 and the latch force 158 extend in a plane 157 along the longitudinal axis 28.

The latch force 158 is at least equivalent to the load force 156 and retains the latch 42 in the closed position when a load force 156 is applied to the cable assembly 10 or mating connector 150. The biasing mechanism 90 also includes a break-off force limit that is greater than the load capacity of the biasing mechanism. The break-off force enables the cable assembly 10 to be disconnected from the mating connector 150.

During connection of the cable assembly 10 and the mating connector 150, the hooks 80 engage the mating end 152 of the mating connector 150. The engagement of the cable assembly 10 and the mating connector 150 creates a force that offsets the load capacity of the biasing mechanism 90. The latch 42 is biased into the open position allowing the hooks 80 to position adjacent the latch cavities 154. The latch 42 then moves into the closed position so that the hooks 80 engage the latch cavities 154. The flat catch surface 84 of each hook 80 retains the hooks 80 within the latch cavities 154. The load capacity of the biasing mechanism 90 enables the latch to generate a latch force 158 within the same plane 157 as the load force 156 that is imposed on the cable assembly 10 and/or mating connector 150. The latch force 158 opposes the load force 156 and maintains a connection between the cable assembly 10 and the mating connector 150.

To disengage the cable assembly 10 and the mating connector 150, an opening force is applied to the actuator 46 that is at least equivalent to the break-off force limit of the biasing mechanism 90. The actuator 46 is moved along the longitudinal axis 28 to bring the ramps 100 in contact with the crossbar 74 of the latch 42. The opening force on the ramps 100 exceeds the break-off force limit of the biasing mechanism 90 and forces the latch 42 into the open position. With the latch 42 in the open position, the cable assembly 10 and the mating connector 150 can be disengaged. After disengagement of the cable assembly 10 and the mating connector 150, the biasing member 90 forces the latch 42 back into the closed position. The crossbar 74 of the latch 42 engages the ramps 100 of the actuator 46 and moves the actuator 46 along the longitudinal axis 28 to the closed position.

The embodiments described herein provide a latch assembly having a latch force that is generated in a direction opposite to the load forces on a cable assembly. The embodiments prevent bowing and malfunctioning of a biasing mechanism of the latch assembly. Accordingly, the cable assembly is capable of withstanding greater load forces without disengagement of the cable assembly connector from a mating connector.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description.

The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A latch assembly for a connector comprising:
a latch coupled to the connector, the latch including a crossbar and a latch arm extending from the crossbar, the latch arm configured to engage a mating connector;
the latch includes an anchor point fixing the latch to the connector, the anchor point being positioned forward of the crossbar, the latch rotating about the anchor point between an open position, where the latch arm is configured to disengage from the mating connector, and a closed position, where the latch arm is configured to engage the mating connector; and
a biasing mechanism engaging the crossbar of the latch rearward of the anchor point to bias the latch into the closed position, wherein the biasing mechanism rotates the crossbar about the anchor point, wherein in the closed position the latch assembly generates a latch force on the mating connector in a direction opposite to a load force imposed on at least one of the connector or the mating connector, the biasing mechanism extending axially in a direction non-parallel to the latch force.

2. The latch assembly of claim 1, wherein the latch force and the load force extend parallel to a longitudinal axis of the connector.

3. The latch assembly of claim 1, wherein the load force is imposed in a direction that disengages the connector and the mating connector.

4. The latch assembly of claim 1, further comprising a latch point positioned on an end of the latch arm, the latch point and the anchor point positioned in a plane that extends parallel to a longitudinal axis of the connector when the latch assembly is in the closed position, the latch point and the anchor point positioned in a plane that extends at an angle with respect to the longitudinal axis when the latch is in the open position.

5. The latch assembly of claim 1 further comprising an actuator coupled to the connector, the actuator configured to bias the latch into the open position.

6. The latch assembly of claim 5 further comprising an actuator guide to guide the actuator in a direction opposite the load force.

7. The latch assembly of claim 1, wherein the biasing mechanism extends generally perpendicular to the latch force.

8. The latch assembly of claim 1, wherein the latch includes a pair of the latch arms, the crossbar extending between the pair of latch arms, each lath arm having a latch hook positioned on an end of the latch arm opposite the crossbar that is configured to engage the mating connector.

9. A latch assembly for a connector comprising:
a latch coupled to the connector, the latch including a crossbar and a latch arm extending from the crossbar, a latch point is positioned on an end of the latch arm opposite the crossbar, the latch point configured to engage a mating connector; and
the latch includes an anchor point, the latch rotating about the anchor point between an open position, where the latch point is configured to disengage from the mating connector, and a closed position, where the latch point is configured to engage the mating connector, the latch point and the anchor point positioned in a plane that extends parallel to a longitudinal axis of the connector when the latch assembly is in the closed position.

10. The latch assembly of claim 9, wherein the latch point and the anchor point are positioned in a plane that extends at an angle with respect to the longitudinal axis, when the latch is in the open position.

11. The latch assembly of claim 9 further comprising a biasing mechanism engaging the crossbar of the latch to bias the latch into the closed position, the biasing mechanism rotates the crossbar about the anchor point.

12. The latch assembly of claim 9, wherein in the closed position the latch assembly generates a latch force on the mating connector that extends parallel to the longitudinal axis of the connector.

13. The latch assembly of claim 9 further comprising an actuator coupled to the connector, the actuator configured to bias the latch into the open position.

14. The latch assembly of claim 9, further comprising a latch hook positioned on an end of the latch arm opposite the crossbar, the latch hook having a rounded side that engages the mating connector to bias the latch into the open position as the connector is being engaged with the mating connector.

15. The latch assembly of claim 9, wherein the latch includes a pair of the latch arms, the crossbar extending between the pair of latch arms, each lath arm having a latch hook positioned on an end of the latch arm opposite the crossbar that is configured to engage the mating connector.

16. A cable connector comprising:
a housing having a cable end and a mating end, the mating end configured to engage a mating connector; and
a latch assembly coupled to the housing, the latch assembly configured to secure the connector to the mating connector, the latch assembly comprising:
a latch having a crossbar and a latch arm extending from the crossbar, a latch point is positioned on an end of the latch arm opposite the crossbar, and
the latch includes an anchor point, the latch rotating about the anchor point between an open position and a closed position, the latch point configured to engage the mating connector when the latch is in the closed position, the latch point and the anchor point positioned in a plane that extends parallel to a longitudinal axis of the connector when the latch assembly is in the closed position.

17. The latch assembly of claim 16, wherein the latch point and the anchor point are positioned in a plane that extends at an angle with respect to the longitudinal axis when the latch is in the open position.

18. The latch assembly of claim 16 further comprising a biasing mechanism engaging the crossbar of the latch to bias the latch into the closed position, the biasing mechanism rotates the crossbar about the anchor point.

19. The latch assembly of claim 16, wherein, in the closed position, the latch assembly generates a latch force on the mating connector that extends parallel to the longitudinal axis of the connector.

20. The latch assembly of claim 16 further comprising an actuator coupled to the connector, the actuator biasing the latch into the open position.

21. The latch assembly of claim 16, wherein the latch includes a pair of the latch arms, the crossbar extending between the pair of latch arms, each lath arm having a latch hook positioned on an end of the latch arm opposite the crossbar that is configured to engage the mating connector.

* * * * *